US006979187B2

(12) United States Patent
Hinzpeter et al.

(10) Patent No.: US 6,979,187 B2
(45) Date of Patent: Dec. 27, 2005

(54) TABLET PRESSING DEVICE

(75) Inventors: Jürgen Hinzpeter, Schwarzenbek (DE); Ingo Schmidt, Schwarzenbek (DE); Ulrich Gathmann, Hamburg (DE); Jörg Gaedecke, Geesthacht (DE)

(73) Assignee: Fette GmbH, (DE)

( * ) Notice: Subject to any disclaimer, the term of this patent is extended or adjusted under 35 U.S.C. 154(b) by 131 days.

(21) Appl. No.: 10/318,806

(22) Filed: Dec. 13, 2002

(65) Prior Publication Data

US 2003/0118682 A1 Jun. 26, 2003

(30) Foreign Application Priority Data

Dec. 14, 2001 (DE) ................................ 101 61 572

(51) Int. Cl.[7] ................................ B29C 43/58

(52) U.S. Cl. ...................... 425/135; 425/162; 425/345; 700/206; 700/249

(58) Field of Search ................................ 425/135–173, 425/78, 344–355; 700/206, 249

(56) References Cited

U.S. PATENT DOCUMENTS

| | | | | |
|---|---|---|---|---|
| 4,633,720 A | * | 1/1987 | Dybel et al. | 700/206 |
| 4,817,006 A | * | 3/1989 | Lewis | 425/149 |
| 5,322,655 A | * | 6/1994 | Ebey | 264/40.5 |
| 6,047,579 A | * | 4/2000 | Schmitz | 700/179 |
| 6,122,565 A | * | 9/2000 | Wenning et al. | 700/206 |

FOREIGN PATENT DOCUMENTS

| | | |
|---|---|---|
| DE | 199 20 377 A1 | 11/2000 |
| DE | 199 33 817 A1 | 1/2001 |
| DE | 199 48 272 A1 | 4/2001 |

* cited by examiner

*Primary Examiner*—Robert Davis
*Assistant Examiner*—Thu Khanh T. Nguyen
(74) *Attorney, Agent, or Firm*—Wall Marjama & Bilinski LLP

(57) ABSTRACT

A tablet-pressing device that includes a tablet press, a control computer configured to drive and regulate the motors of the tablet press, and a service computer which admits the input and output of data for the operation of the tablet press. The tablet press is linked to the control computer via a cable link for high-speed data transfer. The tablet press and the service computer exchange data and control commands via a wireless data link.

4 Claims, 1 Drawing Sheet

TABLET PRESSING DEVICE

BACKGROUND OF THE INVENTION

1. Field of the Invention

The present invention relates generally to devices used to produce tablets, and particularly to a tablet-pressing system having a control computer for controlling and regulating the tablet-pressing device.

2. Technical Background

Advanced tablet presses are capable of pressing up to a maximum of more than 1 million tablets an hour. Tablet press control is performed here via a control or process computer provided for this sole purpose which collects data from measuring points within the tablet press and carries out a regulation of the machine by using the data collected. Further, a separate computer is provided as a service computer. The service computer serves for evaluating operational status data, inspecting production-specific magnitudes, and performing trial runs and the like, for example. As a rule, the service computer is a conventional industrial-use PC which is linked to the control computer via a network. Indeed, the positioning of the service computer relative to the tablet press is restricted by the cable link. In addition, it has been found out that the cable link to the tablet press is a cause of faults which are not correctly identified by an operator or are attributed to the tablet press.

What is needed is a tablet-pressing device which is less vulnerable to faults and admits ease of operation and cleaning.

SUMMARY OF THE INVENTION

The present invention addresses the aforementioned needs. The present invention provides a tablet-pressing device which is less vulnerable to faults, and is relatively easy to operate and clean.

In the inventive tablet-pressing device, the tablet press including its motors and sensors is connected to the control computer via a cable link for high-speed data transfer. Likewise, the tablet press and the service computer are provided with a transmission and reception unit each to exchange data and control commands via a no-cable radio link. The inventive solution provides for a high-speed data transfer link for the control and process computers which allows to achieve a stable regulation behavior even in case of a high production speed. At the same time, the inventive tablet-pressing device provides for the link of the tablet press to the operator to be made via a transmission and reception unit so that data and control commands are exchanged via the radio. Such a data link admittedly is unsuited for transfer at a high data rate, but the data rate which is achievable via a radio or infrared-light device if transmission and/or reception units are used is sufficient for the service computer. A wireless data exchange avoids communication cables in the production sphere, which causes less expenditure in cleaning the production sphere. What adds to this is that installation requires less wiring expenditure and it becomes unnecessary to manufacture cables of a customized cable length. Moreover, no faults occur in the service computers that are due to an erroneous or incomplete link to the tablet press. Another advantage of the inventive wireless link is that there is no longer a hazard of accidents in the production sphere.

In a preferred further aspect, at least one hand-operated device is additionally provided which is equipped with a transmission/reception unit to exchange data with the tablet press and/or the service computer via a no-cable link. A portable hand-operated device has the advantage that an operator, for example, may freely move around the tablet press during a trial run.

Also, the service computer is capable of exchanging data with one or more peripheral devices and driving them via its transmission/reception unit. This makes it unnecessary to cable the peripheral devices to the service computer for the tablet press. For example, if a printer is to be exchanged as a peripheral device this printer may be removed and a new printer may be placed near the service computer with no need to plug it in. A wireless transfer between the transmission and reception units also allows Bluetooth™ compatible transceiver devices to be used.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
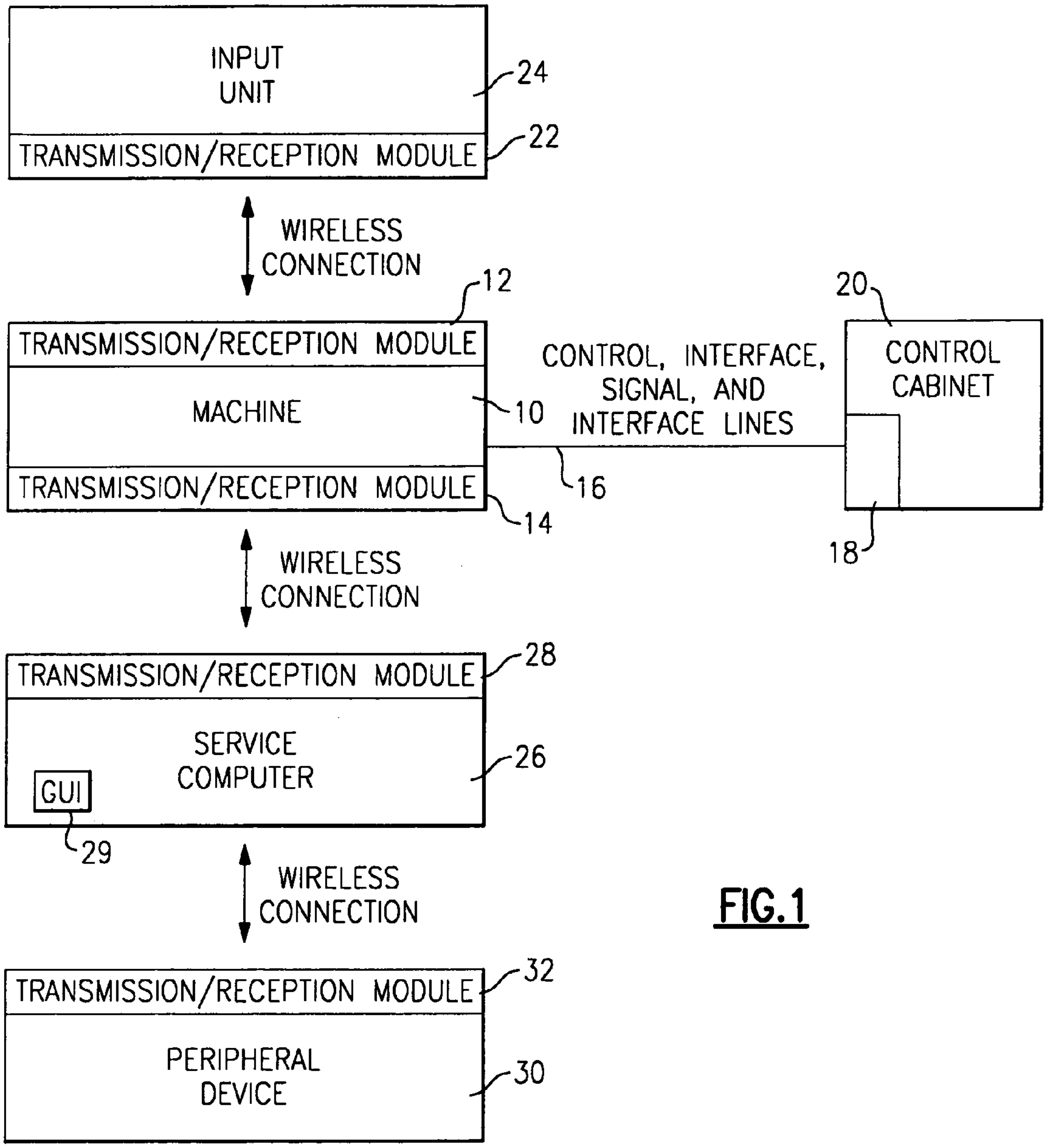
FIG. 1 is a block diagram showing the tablet-pressing system in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the apparatus of the present invention is shown in FIG. 1.

In accordance with the invention, the present invention for a tablet-pressing system includes a tablet press equipped with a plurality of motors and a plurality of sensors configured to capture tablet press state information. The tablet press also includes a tablet press wireless transceiver. A control computer is coupled to the tablet press by a cable data link. The cable data link is configured to provide duplex high-speed data transfer. The control computer is configured to transmit signaling data, interface data, and control data to the tablet press, and receive sensor data from the tablet press. A service computer is coupled to the tablet press. The service computer includes a graphical user interface configured to capture user data and user commands. The service computer also includes a service computer wireless transceiver configured to communicate with the tablet press transceiver to thereby exchange data and control commands via a wireless data link. Thus, the present invention provides a tablet-pressing device which is less vulnerable to faults, and is relatively easy to operate and clean.

As embodied herein, and depicted in FIG. 1, a block diagram showing the tablet-pressing system in accordance with an embodiment of the present invention is disclosed. FIG. 1 shows a tablet press 10 having a transmission/reception (transceiver) module 12 and a second transmission/reception (transceiver) module 14 in a schematic view. The tablet press 10 is connected to the control computer 18 via the line 16 which is schematically shown. The schematically shown link 16 is composed of a multiplicity of control, signal, and interface lines which connect the motors and sensors located on the tablet press 10 to the control computer 18. For a better survey in a control cabinet 20, each of the lines 16 is separately led within the control cabinet. The control cabinet, apart from the control computer, houses the electrical installations for the tablet press.

The control computer collects data from all measuring points of the tablet press 10. Data are transmitted via high-speed data transfer, e.g. by means of a TCP/IP link. The process computer processes the high-speed measuring, controlling, and regulating processes on the tablet press in a real time. Furthermore, the control computer 18 continuously records interventions that the operator makes, in a so-called updating log. In addition, the process data of the tablet press 10 are continually documented in a log of production/log of results. Operational statuses are also recorded for diagnosis.

The tablet press 10, via its transmission/reception (transceiver) module 12, is in a wireless link with a transmission/reception (transceiver) module 22 of an input unit 24. The input unit 24 is preferably designed as a portable hand-operated device with which an operator can freely move in the production sphere while inputting data for the tablet press, e.g. during a trial run.

The service computer 26, via its transmission/reception (transceiver) module, is also linked to the transmission/reception (transceiver) module 14 of the tablet press 10. The service computer, for example, may be an industrial-use PC which is equipped with an non-interrupted power supply and a modem for wireline data communications via telephone line. To operate it, a so-called TSC (Touch Screen Control) input may be provided which offers the use structured information by means of a graphical user interface 29. For example, the service computer 26 may be equipped with an expert system which offers structural information on how to eliminate malfunctions. Likewise, production relevant data may be represented for the use in a graphical layout. The service computer records the batches of the tablets pressed in a so-called batch log.

Any peripheral devices, e.g. printers 30, are also linked to the service computer 26 via a transmission/reception module 32. The printer 30, via its transmission/reception (transceiver) module 32, receives control commands and data on the information to be printed.

The wireless data links of the present invention may be of any suitable type depending on cost or other technical issues. In one embodiment, the wireless data link is implemented using wireless radio transceivers. In another embodiment, the wireless data link is implemented using wireless infrared-light transceiver devices. In yet another embodiment, the wireless data links are implemented using devices that are compatible with Bluetooth™. Those of ordinary skill in the art will understand that Bluetooth™ is a wireless technology is an open platform that was developed and is supported by the Bluetooth Special Interest Group (SIG). The Bluetooth SIG includes over 2,000 member corporations in the telecommunications, computing, and networking industries. Bluetooth™ enables links between mobile computers, mobile phones, portable handheld devices, and connectivity to the Internet. Unlike many other wireless standards, the Bluetooth™ wireless specification includes both link layer and application layer definitions for product developers. The specification supports data, voice, and content-centric applications. Radios that comply with the Bluetooth wireless specification operate in the unlicensed 2.4 GHz radio spectrum. Thus, communication compatibility is ensured worldwide. These radios use a spread spectrum, frequency hopping, full-duplex signal at up to 1,600 hops/sec. The signal hops among 79 frequencies at 1 MHz intervals to give a high degree of interference immunity. Up to seven simultaneous connections can established and maintained.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A tablet-pressing system comprising:

a tablet press including a plurality of motors and a plurality of sensors configured to capture tablet press state information, the tablet press further including a tablet press wireless transceiver;

a control computer coupled to the tablet press by a cable data link, the cable data link being configured to provide duplex high-speed data transfer, the control computer being configured to transmit signal, interface, and control data to the tablet press, and receive sensor data from the tablet press;

a service computer coupled to the tablet press, the service computer including a graphical user interface configured to capture user data and user commands, the service computer also including a service computer wireless transceiver configured to communicate with the tablet press transceiver to thereby exchange data and control commands via a wireless data link; and a portable hand-operated device that is equipped with a wireless transceiver, the wireless transceiver being configured to exchange data with the tablet press and the service computer via the wireless data link, wherein the wireless data link is a bi-directional data link.

2. The tablet-pressing system of claim 1, further comprising one or more peripheral devices configured to exchange data with the service computer via the wireless data link.

3. The tablet-pressing system of claim 1, wherein the wireless data link transmits and receives data via a wireless radio transceiver and/or infrared-light transceiver device.

4. The tablet-pressing system of claim 3, wherein the wireless data link employs transceiver devices compatible with the Bluetooth standard.

* * * * *